United States Patent [19]
Berleyoung et al.

[11] 3,818,763
[45] June 25, 1974

[54] THERMOMETER CONSTRUCTION AND METHOD OF MAKING THE SAME

[75] Inventors: Walter J. Berleyoung, Knoxville; Jay L. Lewis, Concord, both of Tenn.

[73] Assignee: Robertshaw Controls Company, Richmond, Va.

[22] Filed: Nov. 20, 1972

[21] Appl. No.: 307,958

[52] U.S. Cl. ................................. 73/363.7, 73/431
[51] Int. Cl. ............................................. G01k 5/50
[58] Field of Search ................ 73/363.7, 363.9, 431

[56] References Cited
UNITED STATES PATENTS
2,638,785  5/1953  Vacanti et al. ...................... 74/363.7
2,668,446  2/1954  Kraemer ............................ 73/363.7
3,394,593  7/1968  Aldridge et al. .................... 73/363.9

*Primary Examiner*—Donald O. Woodiel
*Attorney, Agent, or Firm*—Candor, Candor & Tassone

[57] ABSTRACT

A thermometer construction having a frame provided with a hub member rotatably mounted thereto. A coiled bimetal member is disposed on the hub member with the inner end of the coil being interconnected to the hub member to move therewith and with the outer end of the coil effectively providing the temperature sensing output of the coiled bimetal member whereby rotation of the hub member relative to the frame calibrates the thermometer construction as the coiled bimetal member rotates in unison therewith.

18 Claims, 4 Drawing Figures

PATENTED JUN 25 1974  3,818,763

THERMOMETER CONSTRUCTION AND METHOD OF MAKING THE SAME

This invention relates to an improved thermometer construction and to a method for making such a thermometer construction or the like.

It is well known that coiled bimetal members have been utilized in thermometer constructions for indicating the temperature being sensed by the coiled bimetal member. However, such coiled bimetal member was normally installed over a fixed hub carried by a frame means so that calibration thereof was accomplished by rotating the spiral or coil of bimetal on the hub and then fixing it in the adjusted position with some sort of cement. Thus, it can be seen that such thermometers were not extremely precise so that frequent complaints of inaccurate readings were received.

Accordingly, it is a feature of this invention to provide an improved thermometer construction of the above type wherein not only is calibration thereof at the factory a relatively simple and accurate matter, but also easy field recalibration can be provided if the same becomes necessary.

In particular, this invention accomplishes the above feature by providing a rotatable hub on a frame means and on which the coiled bimetal member is mounted so that mere rotation of the hub itself will provide calibration of the thermometer construction.

For example, one embodiment of this invention provides a thermometer construction having a hub member rotatably mounted to a frame means. A coiled bimetal member having inner and outer ends is disposed on the hub member with the inner end thereof being interconnected to the hub member to move in unison therewith and with the outer end thereof effectively providing the temperature sensing output of the coiled bimetal member. When it is desired to calibrate such a thermometer construction, the hub member is merely rotated relative to the frame means and the coiled bimetal member rotates therewith so as to be simply, effectively and accurately calibrated.

Accordingly, it is an object of this invention to provide an improved thermometer construction having one or more of the novel features set forth above or hereinafter shown or described.

Another object of this invention is to provide an improved method for making such a thermometer construction or the like.

Other objects, uses and advantages of this invention are apparent from a reading of this description which proceeds with reference to the accompanying drawings forming a part thereof and wherein.

Figure 1:
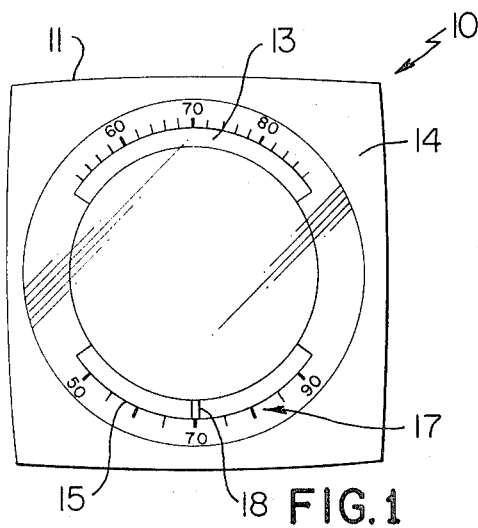
FIG. 1 is a front view of the improved thermometer construction of this invention.

While the various features of this invention are hereinafter described and illustrated as being particularly adapted for providing a thermometer construction for a housing means containing other control parts, it is to be understood that the various features of this invention can be utilized singly or in any combination thereof to provide a thermometer construction by itself or in combination with other structures as desired.

Therefore, this invention is not to be limited to only the embodiment illustrated in the drawings, because the drawings are merely utilized to illustrate one of the wide variety of uses of this invention.

Figure 2:
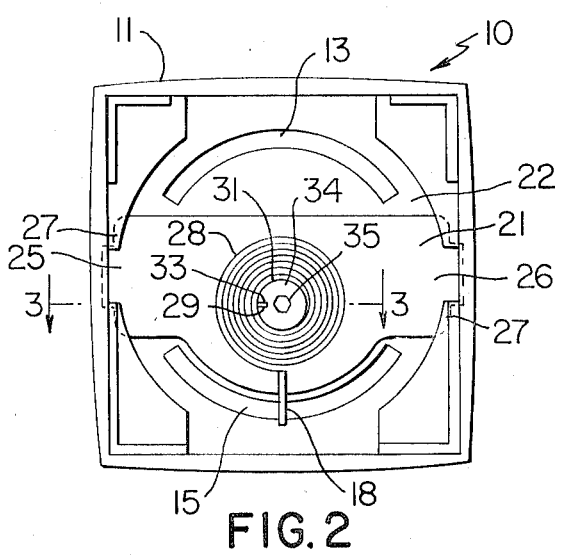
FIG. 2 is a rear view of the thermometer construction of FIG. 1 with the control means utilized in combination with the thermometer construction removed from the housing means.
Figure 3:
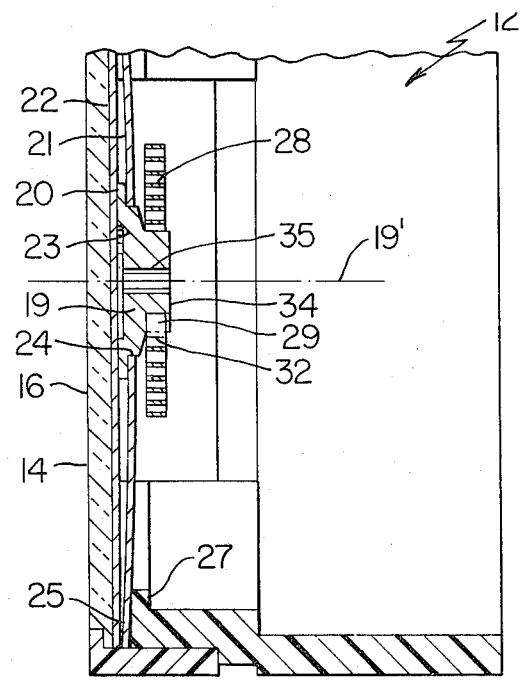
FIG. 3 is an enlarged cross-sectional view taken substantially on line 3—3 of FIG. 2.
Figure 4:
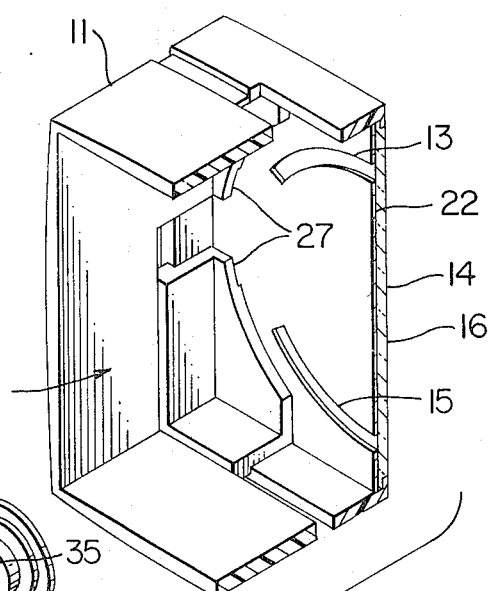
FIG. 4 is an exploded perspective view of the part of the thermometer construction of this invention.
Figure 4:
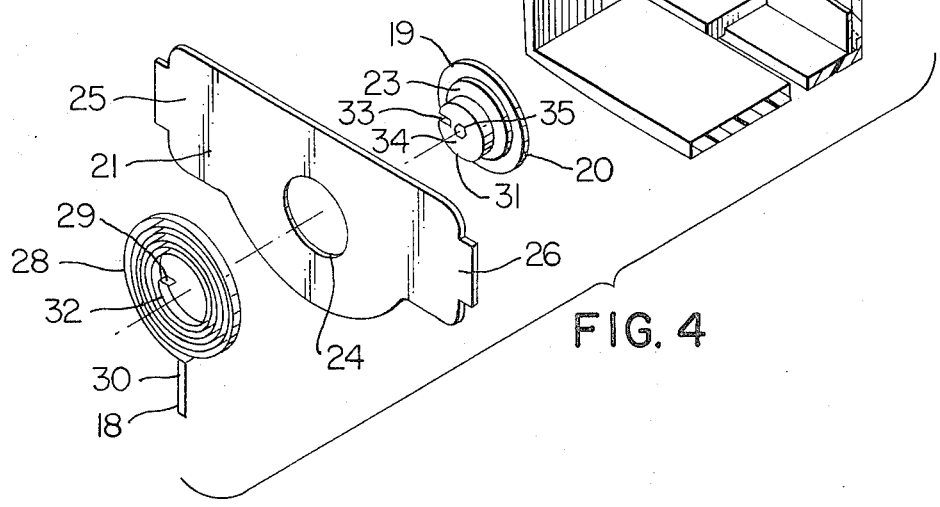

Referring now to FIGS. 1-3, the improved thermometer construction of this invetion is generally indicated by the reference numeral 10 and comprises a housing means or frame structure 11 that is substantially cup-shaped to define a chamber 12 therein for receiving various control parts of a thermostat means (not shown) which is adapted to have its setting viewable at a window means 13 in the front wall 14 of the casing 11.

The front wall 14 of the casing 11 also has another window means 15 therein that forms a part of the thermostat construction 10 of this invention and which is adapted to be closed by a transparent lens 16 as illustrated in FIGS. 1 and 3. A temperature scale 17 is disposed adjacent the window 15 and a movable indicator 18 of the thermometer construction 10 of this invention is viewable at the window 15 to register adjacent the scale 17 and thereby indicate the temperature being sensed by the thermometer construction 10 in a manner now to be described.

A hub member 19 is rotatably mounted to the frame means 11 by having an outwardly directed disc-like part 20 thereof sandwiched between two parts 21 and 22 of the frame structure 11 while a stepped cylindrical part 23 of the hub member 19 projects through an opening 24 in the frame part 21.

The frame part 21 has opposed ends 25 and 26 respectively disposed between projections 27 of the frame means 11 and the frame part 22 in such a manner that the frame part 21 is bowed across the disc-like part 20 of the hub member 19 and thereby has a natural spring bias toward the frame part 22 at the hub 19. Thus, the bowed spring part 21 frictionally engages and compresses the disc-like part 20 of the hub 19 between the frame parts 21 and 22 and thereby frictionally holds the hub member 19 in the selected rotational position as will be apparent hereinafter as the stepped cylindrical part 23 projecting through the opening 24 in the housing part 21 causes the hub member 19 to rotate about the axis 19' illustrated in FIG. 3.

A coiled bimetal member or ribbon 28 having an inner end 29 and an outer end 30 is disposed on the smaller cylindrical part 31 of the stepped cylindrical part 23 of the hub member 19 with the first inner coil 32 preferably being disposed in intimate contact with the cylindrical part 31 while the next adjacent coil thereof being slightly spaced from the innermost coil 32. The inner end 29 of the coiled bimetal member 28 is bent in a substantially radially inward direction and is disposed in a radially disposed slot 33 formed in the flat circular end wall 34 of the cylindrical part 31 of the hub member 19 so as to interconnect the inner end 29 of the coiled bimetal member 28 to the hub 19 to rotate in unison therewith. If desired, a suitable cement or other adhesive can be utilized to secure the inner end 29 of the coiled bimetal member 28 within the slot 33 of the hub member 19.

The outer end 30 of the bimetal member 28 not only is bent so as to be radially disposed outwardly of the coiled bimetal member 28 as illustrated, but also the end 30 is twisted 90° out of the plane of the coiled bimetal member 28 so as to provide a wide flat part at the window 15 of the front wall 14 of the control device 10 in the manner illustrated in FIG. 1 wherein such outer end 30 of the coiled bimetal member 28 provides the previously described indicating means 18 at the window 15.

Thus, as the temperature of the coiled bimetal member 28 increases, the bimetal member 28 warps in such a manner that the end 30 is moved to indicate the sensed temperature output at the window 15. Conversely, as the temperature sensed by bimetal member 28 decreases, the end 30 is moved to indicate such lower sensed temperature in a manner well known in the art.

A hexagonal opening 35 is provided axially through the hub member 19 so as to be coaxial with the axis 19' thereof. In this manner a suitable tool such as an "Allen" wrench can be inserted in the opening 35 through the rear of the casing 11 to rotatably adjust the hub 19 relative to the frame means 14 and, thus, adjust the coiled bimetal member 28 so that the same will indicate the actual temperature that the bimetal member 28 is sensing under controlled conditions. Therefore, it is merely a simple matter during the assembly of the control device 10 to calibrate the thermometer construction 10 as the hub 19 is merely rotated relative to the frame structure 14 and the natural bias of the frame part 21 will hold the hub 19 in such adjusted position. Also, should the thermometer construction 10 require adjustement in the field, the casing 11 is removed from the other control structure and the hub 19 is rotated to recalibrate the same so that the same will provide an accurate reading of the temperature being sensed thereby.

Therefore, it can be seen that this invention not only provides an improved thermometer construction, but also this invention provides an improved method for making such a thermometer construction or the like.

While the form and method of this invention now preferred has been described and illustrated as required by the Patent Statutes, it is to be understood that other forms and methods can be utilized and still come within the scope of the appended claims.

What is claimed is:

1. A thermometer construction comprising frame means, a hub member rotatably mounted to said frame means, and a coiled bimetal member having inner and outer ends and being disposed on said hub member with said inner end thereof being interconnected to said hub member to move therewith and said outer end thereof effectively providing the temperature sensing output of said coiled bimetal member whereby rotation of said hub member relative to said frame means calibrates said thermometer construction as said coiled bimetal member rotates therewith, said hub member having a disc-like portion, said frame means having two parts thereof sandwiching said disc-like portion therebetween to rotatably mount said hub member to said frame means.

2. A thermometer construction as set forth in claim 1 wherein said outer end of said coiled bimetal member is bent relative to said coil to extend substantially radially outwardly therefrom.

3. A thermometer construction as set forth in claim 2 wherein said frame means has a scale means thereon, said bent outer end of said coiled bimetal member being movable adjacent said scale means to indicate the temperature being sensed by said coiled bimetal member.

4. A thermometer construction as set forth in claim 3 wherein said bent outer end of said coiled bimetal member is also twisted out of the normal plane thereof.

5. A thermometer construction as set forth in claim 1 wherein said hub member has a slot therein, said inner end of said coiled bimetal member being disposed in said slot to interconnect said inner end to said hub member.

6. A thermometer construction as set forth in claim 5 wherein said slot is radially disposed relative to said hub member and wherein said inner end of said coiled bimetal member is bent relative to said coil to extend substantially radially inwardly therefrom.

7. A thermometer construction as set forth in claim 1 wherein one of said frame parts has an opening therethrough, said hub member having a cylindrical part thereof projecting through said opening to rotatably mount itself to said frame means.

8. A thermometer construction as set forth in claim 7 wherein one of said frame parts has a natural bias toward said other frame part at said disc-like portion of said hub member to frictionally clamp said disc-like part therebetween to hold said hub member in the adjusted rotational position thereof.

9. A thermometer construction as set forth in claim 8 wherein said cylindrical part of said hub member has a tool receivable slot therein for facilitating the rotation of said hub member for calibrating said thermometer construction.

10. A method for making a thermometer construction comprising the steps of rotatably mounting a hub member to a frame means, disposing a coiled bimetal member on said hub member with the inner end of said coil being interconnected to said hub member to move therewith and the outer end of said coil effectively providing the temperature sensing output of said coiled bimetal member, forming said hub member with a disc-like portion, sandwiching said disc-like portion between two parts of said frame means to rotatably mount said hub member to said frame means and rotating said hub member relative to said frame means to calibrate said thermometer construction as said coiled bimetal member rotates therewith.

11. A method for making a thermometer construction as set forth in claim 10 and including the step of bending said outer end of said coiled bimetal member relative to said coil to extend substantially radially outwardly therefrom.

12. A method for making a thermometer construction as set forth in claim 11 and including the step of forming said frame means with a scale means theron so that said bent outer end of said coiled bimetal member is movable adjacent said scale means to indicate the temperature being sensed by said coiled bimetal member.

13. A method for making a thermometer construction as set forth in claim 12 and including the step of twisting said bent outer end of said coiled bimetal member out of the normal plane thereof.

14. A method for making a thermometer construction as set forth in claim 10 and including the steps of forming a slot in said hub member, and disposing said inner end of said coiled bimetal member in said slot to interconnect said inner end to said hub member.

15. A method for making a thermometer construction as set forth in claim 14 and including the steps of forming said slot so as to be radially disposed relative to said hub member, and bending said inner end of said coiled bimetal member relative to said coil to extend substantially radially inwardly therefrom.

16. A method for making a thermometer construction as set forth in claim 10 and including the steps of forming one of said frame parts with an opening therethrough, and projecting a cylindrical part of said hub member through said opening to rotatably mount said hub member to said frame means.

17. A method for making a thermometer construction as set forth in claim 16 and including the step of forming one of said frame parts with a natural bias toward said other frame part at said disc-like portion of said hub member to frictionally clamp said disc-like part therebetween to hold said hub member in the adjusted rotational position thereof.

18. A method for making a thermometer construction as set forth in claim 17 and including the step of forming said cylindrical part of said hub member with a tool receivable slot therein for facilitating the rotation of said hub member for calibrating said thermometer construction.

* * * * *